United States Patent
Kuribayashi

(10) Patent No.: US 7,443,415 B2
(45) Date of Patent: Oct. 28, 2008

(54) OPTICAL BEAM SCANNING DEVICE AND IMAGE FORMING APPARATUS HAVING WINDOW FOR POLYGON MIRROR COVER

(75) Inventor: Yasushi Kuribayashi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 497 days.

(21) Appl. No.: 11/196,311

(22) Filed: Aug. 4, 2005

(65) Prior Publication Data
US 2007/0030496 A1     Feb. 8, 2007

(51) Int. Cl.
*B41J 27/00* (2006.01)

(52) U.S. Cl. .................. 347/259; 347/258

(58) Field of Classification Search ............... 347/259, 347/127, 258; 358/1.7; 359/207, 205, 212, 359/206
See application file for complete search history.

(56) References Cited

U.S. PATENT DOCUMENTS

| | | | | |
|---|---|---|---|---|
| 4,863,227 A | * | 9/1989 | Takanashi | 359/207 |
| 4,930,869 A | * | 6/1990 | Miyagawa et al. | 359/205 |
| 6,400,488 B1 | * | 6/2002 | Nagasaka et al. | 359/212 |
| 6,501,586 B1 | * | 12/2002 | Takayama | 359/206 |
| 2004/0001136 A1 | * | 1/2004 | Suzuki et al. | 347/129 |

FOREIGN PATENT DOCUMENTS

| | | | |
|---|---|---|---|
| JP | 09-274134 A | | 10/1997 |
| JP | 10-148781 A | | 6/1998 |
| JP | 2001318335 | * | 11/2001 |

* cited by examiner

*Primary Examiner*—Stephen D Meier
*Assistant Examiner*—Carlos A Martinez, Jr.
(74) *Attorney, Agent, or Firm*—Foley & Lardner LLP

(57) ABSTRACT

An optical beam scanning device includes a light deflecting device with at least a polygon mirror portion of which is covered by a cover having a cover window portion for keeping a passage for an entering/emitting light, a pre-deflection optical system for entering an optical beam from a light source into said light deflecting device and a post-deflection optical system for focusing a reflection light from said light deflecting device on a surface to be scanned. The light deflecting device, post-deflection optical system and the cover window portion are so disposed that the pretreated light-shielding reflection light from the cover window portion avoids from striking upon a flange portion and an edge portion of one or a plurality of the optical element parts within the post-deflection optical system, with respect the entering light.

7 Claims, 8 Drawing Sheets

OPTICAL BEAM SCANNING DEVICE AND IMAGE FORMING APPARATUS HAVING WINDOW FOR POLYGON MIRROR COVER

BACKGROUND OF THE INVENTION

The present invention relates to an image forming apparatus, such as a laser printer, a digital copy machine, etc., for example, and it also relates to an optical beam scanning device, being applicable into such the image forming apparatus.

For dealing with speed-up or high-speed of the optical beam scanning devices, the sound of wind noises generated by a polygon mirror come to be large if increasing the rotation speed of a polygon motor, and an amount of heat generation therein also increases. For reducing such the drawbacks, it is effective to provide on the polygon mirror a cover for sound insulation or cooling thereof. Further, the cover also can achieve a function of protecting the reflection surfaces of the polygon mirror from adhesion of dusts thereupon. When providing the cover, it is necessary to provide a window (i.e., a cover glass) for allowing a light beam to enter and emit therethrough. Although treating an anti-reflection coating upon the cover glass, it is impossible to reduce the reflection thereupon down to zero (0), completely; therefore, still the reflection light is generated thereon.

This reflection light, impinging or striking upon a flange portion or an edge portion of a scanning optical system element (i.e., a lens and a mirror, etc.), reaches an image surface as a fixed stray light, thereby bringing about a possibility of exerting a bad influence upon a copying image and/or a printing image formed thereon.

For solving such the drawback due to the reflection light, there is already described a method in Japanese Patent Laid-Open No. 9-274134 (1997), for example. In the method described therein, a cover glass disposed surrounding the polygon mirror is so inclined that the reflection light can escape into the sub-scanning direction, for the purpose of removing such the stray light therefrom. Thus, since a scanning line is curved into the sub-scanning direction on the surface to be scanned with that inclination, a correction flat plate is also provided, for correcting or compensating the curve of the scanning line, which is generated on the cover glass.

However, with this method, the cover glass is inclined, resulting in deteriorating or degrading the optical characteristics, and further there is added a correction flat plate for correcting or compensating that. With this flat plate, though it is possible to make the correction or compensation, it brings about a drawback of increasing the number of parts thereof, and also there may be a possibility that the optical characteristics thereof are lowered due to an increase of optical surfaces therein, even thought it is the flat plate.

BRIEF SUMMARY OF THE INVENTION

An object of an embodiment, according to the present invention, is to provide an optical beam scanning device which can be prevented from deteriorating in the picture quality due to the reflection light introduced from the cover window portion of the polygon mirror, and also an image forming apparatus of applying such the optical beam scanning device therein.

According to an embodiment of the present invention, there is provided an optical beam scanning device, including: a light deflecting device, at least a polygon mirror portion of which is covered by a cover having a cover window portion for keeping a passage for an entering/emitting light; a pre-deflection optical system for entering an optical beam from a light source into the light deflecting device; and a post-deflection optical system for focusing a reflection light from the light deflecting device on a surface to be scanned, wherein constituent elements of the light deflecting device and the post-deflection optical system and the cover window portion are so disposed that the reflection light from the cover window portion, before being treated a light-shielding process thereupon, avoids from striking upon a portion outside an effective area of one or a plurality of the optical element parts within the post-deflection optical system, with respect to the entering light. The portion outside an effective area corresponds to the flange portion and the edge portion.

An image forming apparatus, according to the present invention, has the optical beam scanning, device therein, according to one embodiment of the present invention.

BRIEF DESCRIPTION OF THE DRAWING

Those and other objects, features and advantages of the present invention will become more readily apparent from the following detailed description when taken in conjunction with the accompanying drawings wherein.

DESCRIPTION OF THE EMBODIMENTS

(A) First Embodiment

Hereinafter, explanation will be made on a first embodiment of the optical beam scanning device and the image forming apparatus, according to the present invention.

Figure 1:
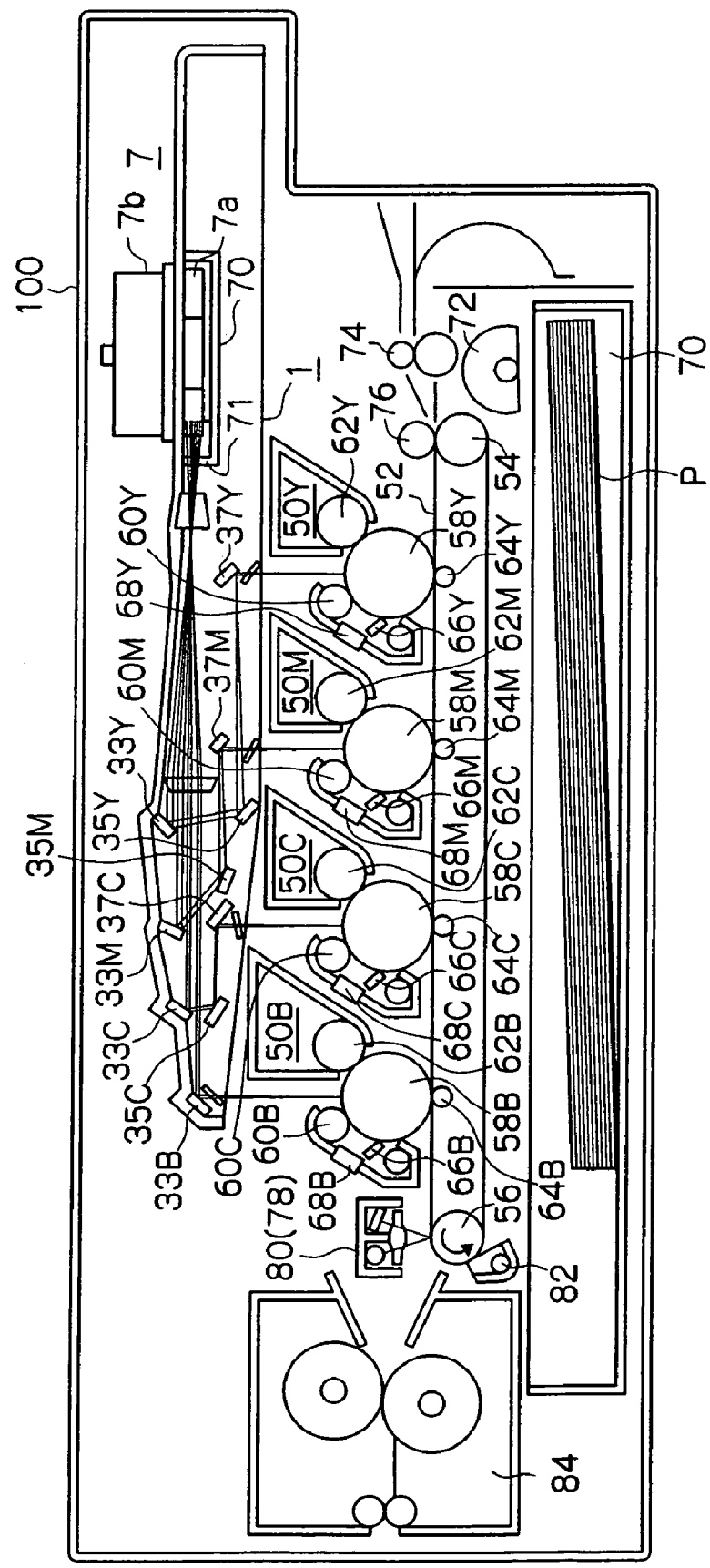
FIG. 1 is a vertical cross-section view of an outline of a color image forming apparatus, applying a scanning device of four (4) optical beams therein, according to a first embodiment of the present invention.

FIG. 1 shows the color image forming apparatus using a scanning device of four (4) optical beams, according to the first embodiment. FIG. 1 is the vertical cross-section view of an outline of the color image forming apparatus, according to the first embodiment.

However, within the color image forming apparatus of such the kind, in general, there are applied four (4) sets of various devices, for diving image data, into four (4) kinds of color components, such as Y (yellow), M (magenta), C (cyan) and B (Black), for example, respectively, and for forming an image for each of those color components, corresponding to Y, M, C and B. Therefore, identification will be made by attaching Y, M, C and B to the reference numerals, upon the image data and the devices corresponding thereto for each of the color components.

As shown in FIG. 1, an image forming apparatus 100 includes first to fourth image forming portions 50Y, 50M, 50C and 50B, each for forming an image of an each color component, being separated in the color.

The image forming portions 50 (Y, M, C and B) are disposed below optical beam scanning devices 1 corresponding thereto, at the position where laser beams L (Y, M, C and B) are emitted for optically scanning the image information of the respective color components by means of a first mirror 33B and a third mirrors 37Y, 37M and 37C of a multi-beam light scanning device 1, the details of which will be mentioned later by referring to FIG. 2, in the sequence of the image forming portions 50Y, 50M, 50C and 50B.

Below each of the image forming portions 50 (Y, M, C and B) is disposed a conveyer belt 52 for conveying transfer material for transferring the image formed through respective one of those image forming portions 50 (Y, M, C and B).

The conveyer belt 52, suspended between a belt-driving roller 56 and a tension roller 54 rotating in an arrow direction, is rotated at a predetermined speed, into the direction in which the belt-driving roller 56 is rotated, by means of a motor not shown in the figure.

The image forming portions 50 (Y, M, C and B) have photosensitive drums 58Y, 58M, 58C and 58B formed into a cylindrical shape to be rotatable into a arrow direction, respectively, each of which forms an electrostatic latent image corresponding to the image exposed by the optical beam scanning device 1.

Around each of the photosensitive drums 58 (Y, M, C and B), there are disposed the followings, in that order, in a direction of rotating each of the photosensitive drums 58 (Y, M, C and B): i.e., a charging device 60 (Y, M, C or B) for providing a predetermined electric potential on each surface of the photosensitive drums 58 (Y, M, C and B); a development device 62 (Y, M, C or B) for developing an image by supplying a toner having a color corresponding to the electrostatic latent image, which is formed on the each surface of the photosensitive drums 58 (Y, M, C and B); a transcription device 64 (Y, M, C or B), being disposed opposing to each of the photosensitive drums 58 (Y, M, C and B) from a rear surface of the conveyer belt 52, under the condition that the conveyer belt 52 interposed between the each of the photosensitive drums 58 (Y, M, C and B), for transferring a toner image on each of the photosensitive drums 58 (Y, M, C and B) onto a transfer material, e.g., a paper P, which is transferred on the conveyer belt 52; a cleaner 66 (Y, M, C or B) for removing the toner remaining on the each of the photosensitive drums 58 (Y, M, C and B), i.e., not being transcribed when transferring the toner image onto the paper by means of the transfer device 64 (Y, M, C or B); and a discharging device 68 (Y, M, C or B) for removing the remaining electric potential on each of the photosensitive drums 58 (Y, M, C and B) after transfer of the toner image by means of the each transfer device 64 (Y, M, C or B).

Below the conveyer belt 52 is disposed a paper cassette 70 for receiving the papers P, onto which are transferred the images formed by the image forming portions 50 (Y, M, C and B), respectively.

At an end of the paper cassette 70 of a side being close to the tension roller 54, there is disposed a delivery roller 72 formed to be nearly crescent-like, for sending out the papers P received within the paper cassette 70, one by one, from the uppermost portion thereof.

Between the delivery roller 72 and the tension roller 54, there is disposed a registration roller 74 for aligning a front end of one (1) piece of paper P taken out from the cassette 70 with a front end of the toner image, which is formed on the photosensitive drums 58B of the image forming portion 50B (for Black).

In the vicinity of the tension roller 54 between the registration roller 74 and the first image forming portion 50Y, substantially, at the position opposing to an outer periphery of the conveyer belt 52 corresponding to the position where the tension roller 54 and the conveyer belt 52 come close to each other, there is disposed a suction roller 76 for providing a predetermined electrostatic suction force onto one (1) piece of paper P, which is transferred at a predetermined timing by means of the registration roller 74.

At an end of the conveyer belt 52 and in the vicinity of the belt-driving roller 56, substantially, on the outer periphery of the conveyer belt 52 in contact with the belt-driving roller 56, there are disposed registration sensors 78 and 80 for detecting the position of an image, which is transferred on the conveyer belt 52 or on the paper P, at a predetermined distance therebetween, in an axial direction of the belt-driving roller 56 (however, the first sensor 78 cannot be seen on a front cross-section view of FIG. 1, since it is positioned in the front of a sheet surface in FIG. 1).

On the outer periphery of the conveyer belt 52 in contact with the belt-driving roller 56, in particular, at the position where it never be in contact with the paper P, which is transferred on the conveyer belt 52, there is disposed a conveyer belt cleaner 82 for removing the toner attaching on the conveyer belt 52 or paper residues of the paper P, etc.

In the direction where the paper P transferred via the conveyer belt 52 is separated from the belt-driving roller 56 and it is further transferred, there is disposed a fixing device 84 for fixing the toner image transcribed thereon onto the paper P.

Figure 2:
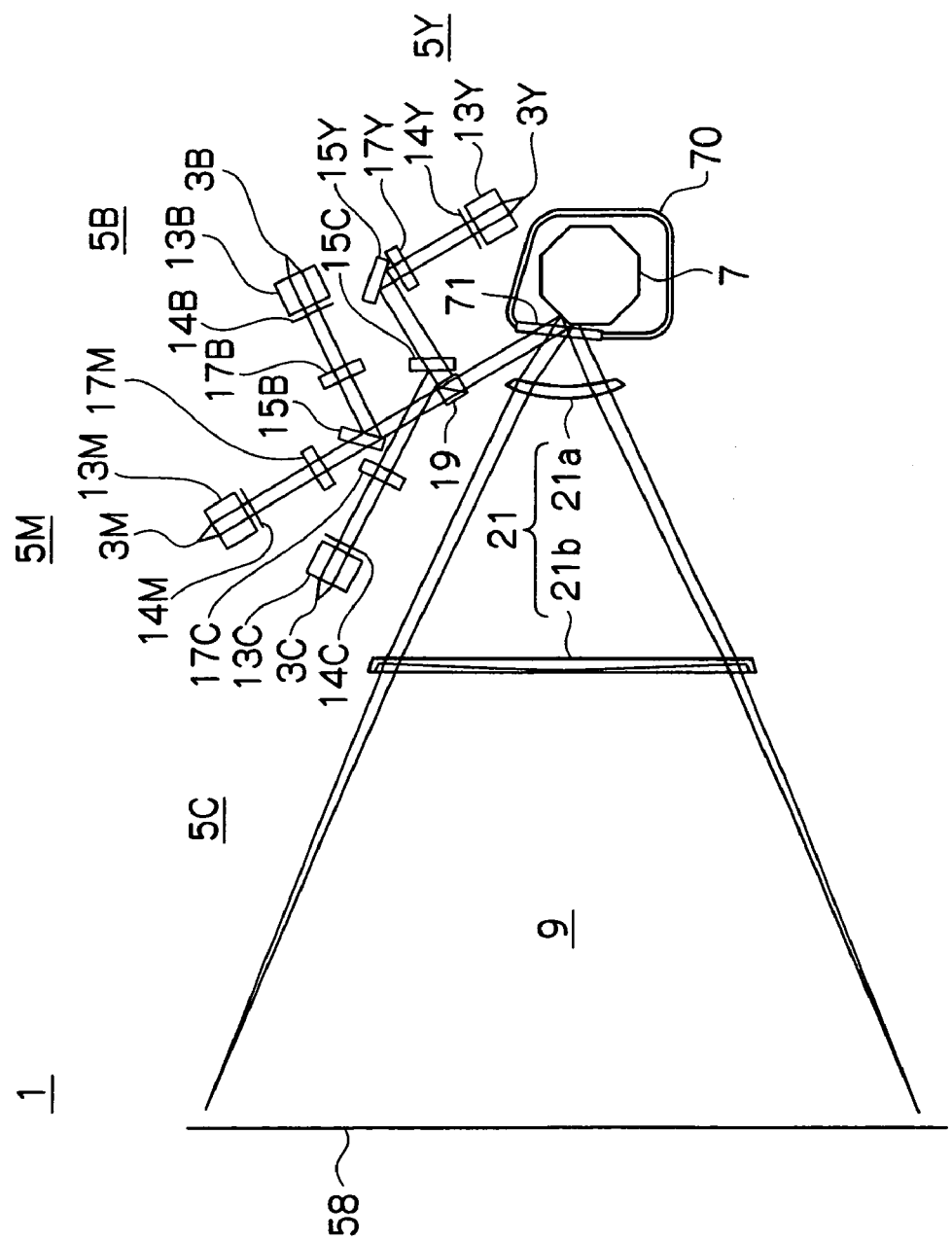
FIG. 2 is a brief plane view showing the disposition of optical elements in the scanning device of 4 optical beams, which is to be installed into the image forming apparatus shown in FIG. 1.

FIG. 2 shows the scanning device 1 of four (4) optical beams, which is installed within the image forming apparatus 100 shown in FIG. 1. In relation to a post-deflection optical system, it also shows the optical beams, by expanding the bent on a sheet surface of the figure, upon the mirrors.

The scanning device 1 of four (4) optical beams has light sources 3Y, 3M, 3C and 3B, each for outputting an optical beam directing to the first to fourth image forming portions 50Y, 50M, 50C and 50B shown in FIG. 1, respectively, and only one optical deflection device 7, as a deflecting means for deflecting (or scanning) a light beam (i.e., a laser beam) irradiated by each of the light sources 3 (Y, M, C and B), directing onto the image surfaces disposed at predetermined positions, e.g., the outer peripheral surfaces of the photosensitive drums 58Y, 58M, 58C and 58B of the first to fourth image forming portions 50Y, 50M, 50C and 50B shown in FIG. 1, at a predetermined linear velocity. Between the light deflection device 7 and the respective light source 3 (Y, M, C or B) is disposed a pre-deflection optical system 5 (Y, M, C or B), and between the light deflection device 7 and the image surface is disposed the post-deflection optical system 9, respectively.

The pre-deflection optical system 5 includes therein, as shown in FIG. 2, a light source 3 (Y, M, C or B) for each of the color components, being made of a semiconductor laser element, a finite focus lens (or, a collimator lens) 13 (Y, M, C or B) for providing a predetermined converging property onto a laser beam emitted from each of the light sources 3 (Y, M, C or B), a lens stop 14 (Y, M, C or B) for providing an arbitrary cross-section configuration to the laser beam L passing through the finite focus lens 13 (Y, M, C and B), and cylindrical lens 17 (Y, M, C or B) for further providing a predetermined converging property onto the laser beam passing through the stop 14 (Y, M, C or B), in relation to a sub-scanning direction thereof, wherein the laser beam emitted from each of the light sources 3 (Y, M, C and B) is defined into a predetermined beam configuration in the cross-section thereof, to be guided onto the light deflection surface of the light deflection device 7.

A yellow laser beam LY emitted from the cylindrical lens 17Y, after being bent by means of the mirror 15Y, passes through a lower portion (or an upper portion) of the mirror 15C, and is reflected by a beam splitter (or, a half mirror) 19, thereby to be guided onto the light deflection surface of the light deflection device 7. A magenta LM emitted from the cylindrical lens 17M, after passing through a lower portion (or an upper portion) of the mirror 15B, propagates straightforward within the beam splitter 19, thereby to be guided onto the light deflection surface of the light deflection device 7. A cyan laser beam LC emitted from the cylindrical lens 17C, after being bent by means of the mirror 15C in the optical path thereof, is reflected by the beam splitter 19, thereby to be guided onto the light deflection surface of the light deflection device 7. A black laser beam LB emitted from the cylindrical lens 17B, after being bent by means of the mirror 15B, propagates straightforward within the beam splitter 19, thereby to be guided onto the light deflection surface of the light deflection device 7.

The light deflection device 7 has a polygon mirror 7a, being made up with eight (8) pieces of the plane reflection surfaces (i.e., plane mirrors) into an equilateral polygonal shape, for example, and a motor 7b for rotating the polygon mirror 7a at a predetermined velocity into a main scanning direction thereof.

The polygon mirror 7a is, at least, covered with a cover 70, as shown in FIGS. 1 and 2. When increasing the rotation speed of the polygon motor for dealing with the speed-up, then the sound of wind noises comes up to be large, and an amount of heat generation of the motor is also increased; therefore, for the purpose of reducing those, the cover (i.e., a polygon mirror cover) 70 is attached onto the polygon mirror 7a, for absorbing or isolating the sound of noises and for cooling. A portion of the polygon mirror cover 70 is made of a cover glass 71, for enabling the laser beam to be incident upon the polygon mirror 7a, and also for enabling the reflection light upon the polygon mirror 7a to exit therethrough (however, the material of this portion should not be limited to the glass, only).

The post-deflection optical system 9 has a set 21 of two (2) pieces of fθ lenses (image forming lenses) 21a and 21b, for optimizing configuration and the position upon the images of the laser beams L (Y, M, C and B), which are deflected (or scanned) by the polygon mirror 7a, and as shown in FIG. 1, a plurality of mirrors, 33Y, 35Y, 37Y, 33M, 35M, 37M, 33C, 35C, 37C and 33B, for guiding the laser beams L (Y, M, C and B) of the respective color components which are emitted from the set 21 of two (2) pieces of fθ lenses on the corresponding photosensitive drums 58 (Y, M, C and B).

Figure 3:
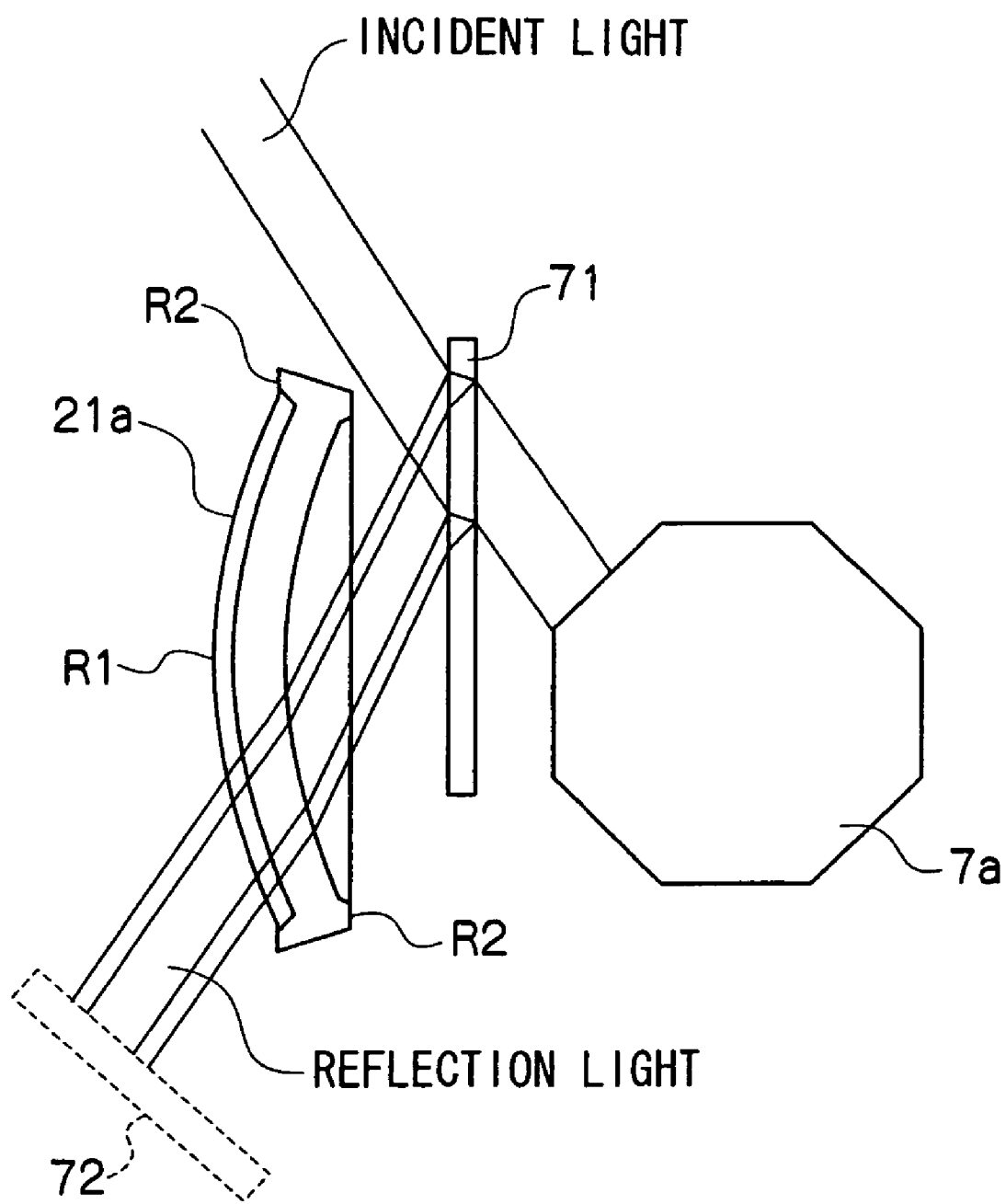
FIG. 3 is a view explaining the structures for counter measures, according to the first embodiment, so as to prevent the light reflecting from a cover glass of a polygon mirror cover from coming to be a stray light.

For the fθ lens 21a near the polygon mirror 7a, there is provided a light shielding wall 72 in the vicinity thereof, as shown in FIG. 3, which will be mentioned later.

FIG. 3 is a view explaining about the structures of preventing the light reflecting from the cover glass 71 of the polygon mirror cover 70 from coming into a stray light, according to the first embodiment of the present invention. FIG. 3 is an enlarged view showing portions from the polygon mirror 7a up to the fθ lens 21a.

Reflection of an incident light (i.e., the laser beam) upon the cover glass 71 occurs on a front surface and a rear surface thereof, and multiple reflections are also included therein. The cover glass 71 has a thickness of about 2 mm, for example, and depending upon that thickness, the light paths are slightly shifted, on the front surface and the rear surface, into the direction perpendicular to the optical axis thereof. Thus, the reflection light is slightly expanded, comparing to the incident light.

Parameters relating to the light reflecting from the cover glass 71, which can be determined when designing the optical system, include the following: a position and an angle of the cover glass 71; a position and an angle where the light beam is incident upon the cover glass 71; a position, an effective area and outer sizes of optical element parts (lens, mirror, etc.) within the deflection optical system; and a flange configuration, etc.

In FIG. 3, according to the first embodiment, the parameters mentioned above are so selected and/or determined that the incident light passes through one of outer sides of the fθ lens 21a (however, it may pass through an effective area R1 of the fθ lens 21a), while the light reflecting from the cover glass 71 passes through the effective area R1 of the fθ lens 21a, but the light comes off from the flange portion and the edge portion R2. The reflection light passing through the effective area R1 of the fθ lens 21a is shielded by the light-shielding wall 72, an angle of which is so determined that the reflection light does not turn into the direction of the fθ lens 21a and other optical element parts. Further, if there is no member of causing the problem of stray lights in the direction of propagation thereof, the light-shielding wall 72 may be omitted. In other words, if the structure itself can achieve the light shielding process thereon, but without providing such the light shielding as was intended in the above, then the light-shielding wall 72 may be omitted.

In a method for determining the parameters, since the position and the angle of the incident light upon the cover glass 71 are accompanied with deterioration in the an optical characteristics or properties thereof, and further regarding the positions and the outer sizes of the fθ lens 21a and the other optical element parts, since redesigning thereof is also accompanied with (i.e., if moving a certain part, it is necessary to enlarge the effective area of a lens, so as to compensate the angle of field of scanning, for example), it is preferable to manage with the shift of the cover glass 71 into the propagation direction of light beam (i.e., Z direction in FIG. 3), as a portion for fine adjustment, by taking those items into the consideration before doing the designing thereof.

However, the cover glass 71 may be slightly inclined into the sub-scanning direction in some degree without causing a problem in light quantity irregularity (however, preferably, no mechanism is provided for adjusting an angle thereof). As mentioned above, in case where the color image forming apparatus is applied therein, it is preferable that the cover glass 71 is provided along with the main scanning direction (i.e., the X direction in FIG. 3), so as to suppress the difference in the quantity of lights at various scanning positions on the image surface.

As mentioned above, according to the first embodiment of the present invention, since the reflection light from the cover glass of the polygon mirror cover passes through the effective area of the fθ lens 21a, it is possible to avoid the reflection thereof into the direction not intended, upon the flange portion and/or the edge portion (i.e., an outer portion of the effective area on the fθ lens 21a), and as a result thereof, it is possible to protect from the deterioration in the picture quality due to the light reflecting from the cover glass.

(B) Second Embodiment

Next, explanation will be made on a second embodiment of the optical beam scanning device and the image forming apparatus, according to the present invention. The second embodiment differs from the first embodiment in the measures against the reflection light from the cover glass 71 of the polygon mirror cover 70.

Figure 4:
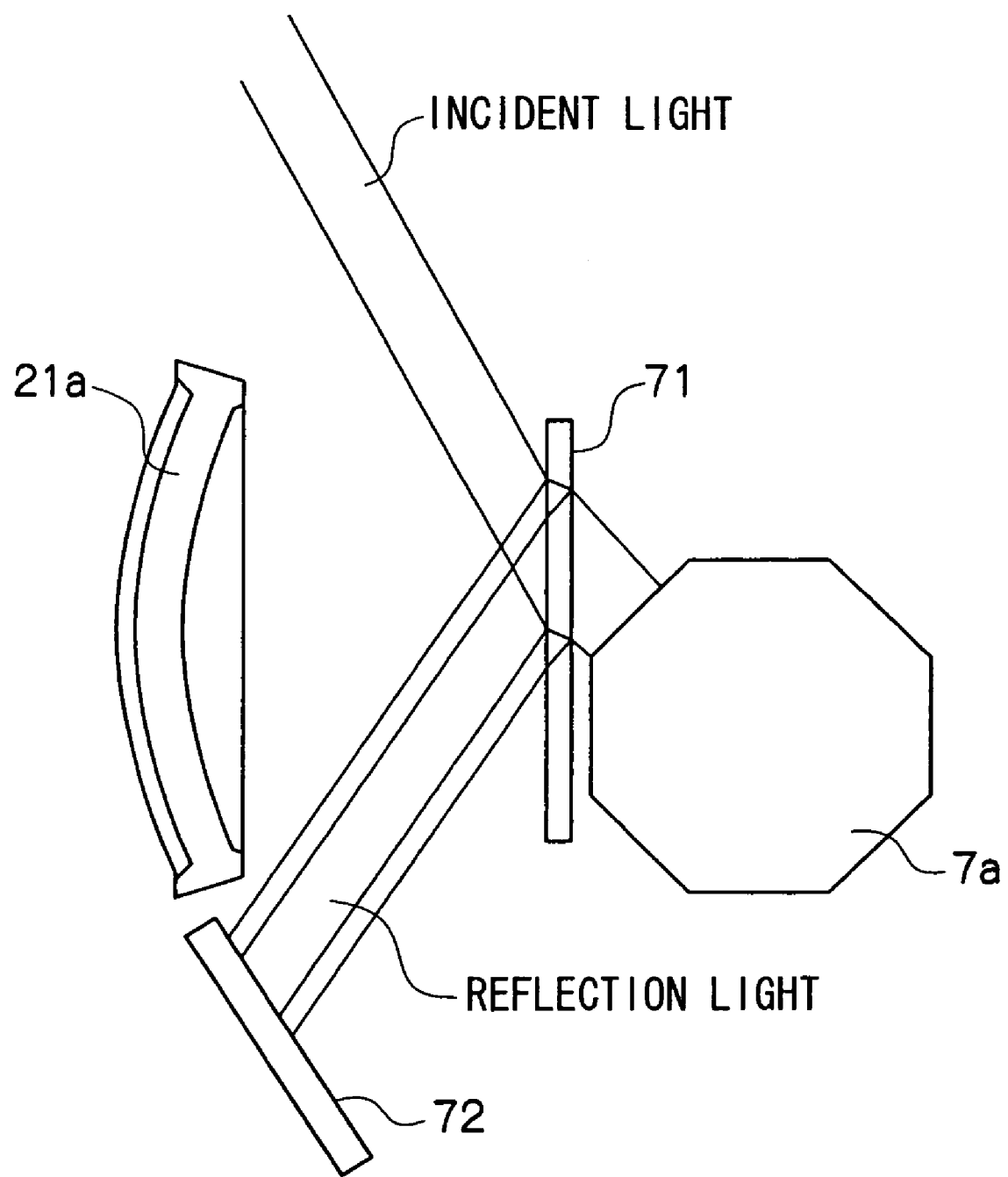
FIG. 4 is a view explaining the structures for counter measures, according to a second embodiment, so as to prevent the light reflecting from a cover glass of a polygon mirror cover from coming to be a stray light.

FIG. 4 is a view explaining about the structures of preventing the light reflecting from the cover glass 71 of the polygon mirror cover 70 from coming into a stray light, according to the second embodiment, corresponding to that shown in FIG. 3 according to the first embodiment.

In FIG. 4, according to the second embodiment, the parameters mentioned in the first embodiment are so selected and/or determined, that the incident light passes through one of outer sides of the fθ lens 21a (however, it may pass through an effective area of the fθ lens 21a), while the light reflecting from the cover glass 71 passes through the other outer side of the fθ lens 21a. The reflection light is shielded by means of a light-shielding wall 72, an angle of which is so determined that the reflection light does not turn into the direction of the fθ lens 21a and other optical element parts.

Thus, according to the second embodiment, since the light reflecting from the cover glass of the polygon mirror cover passes through the outer side of the fθ lens, it is possible to avoid the reflection thereof into the direction not intended, upon the flange portion and/or the edge portion of the fθ lens, and as a result thereof, it is possible to protect from the deterioration in the picture quality due to the light reflecting from the cover glass.

(C) Third Embodiment

Next, explanation will be made on a third embodiment of the optical beam scanning device and the image forming apparatus, according to the present invention. This third embodiment differs from the first and second embodiments in the measures against the reflection light from the cover glass 71 of the polygon mirror cover 70.

Figure 5:
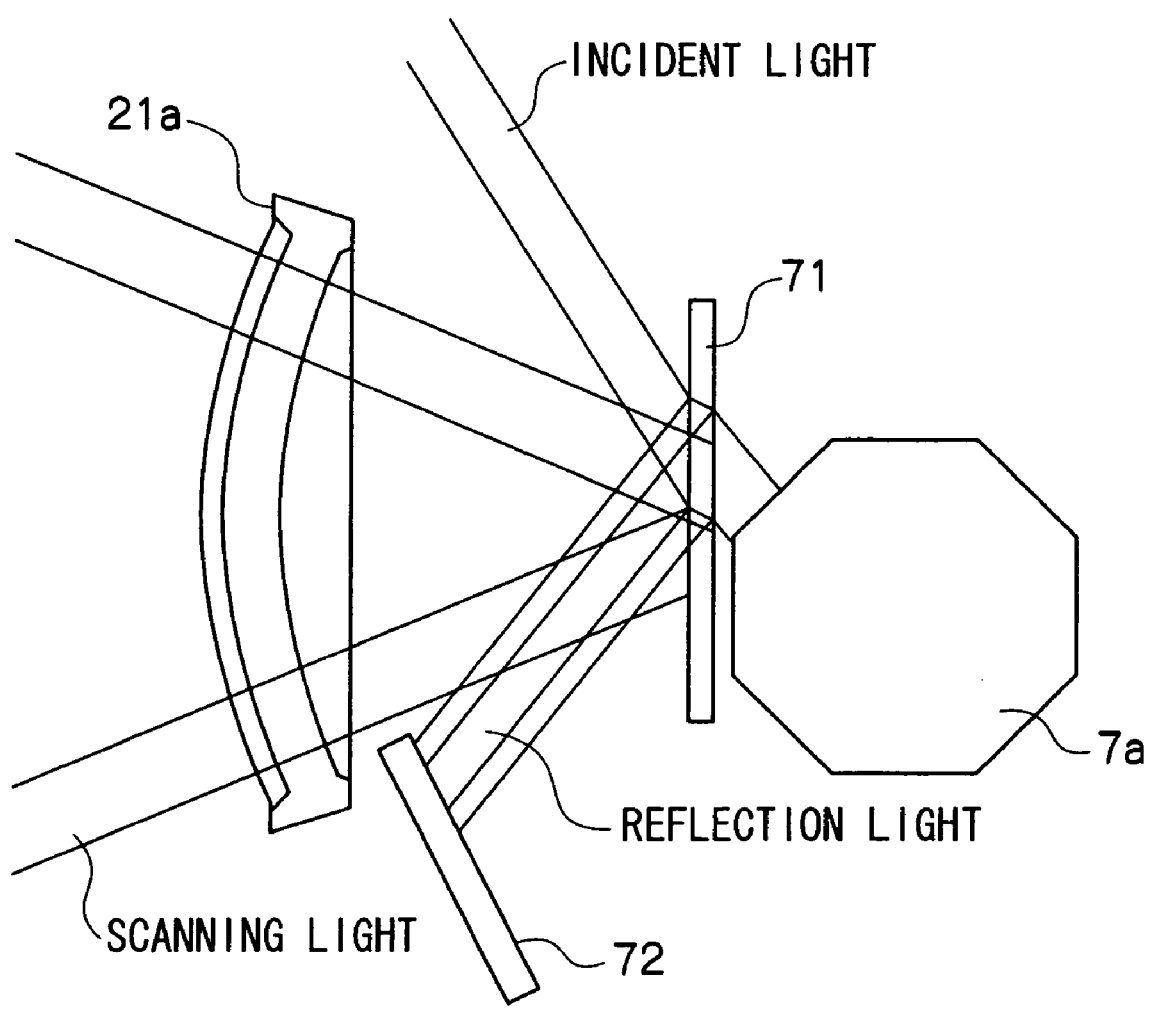
FIG. 5 is a view explaining the structures for counter measures, according to a third embodiment, so as to prevent the light reflecting from a cover glass of a polygon mirror cover from coming to be a stray light.

FIG. 5 is a view explaining about the structures of preventing the light reflecting from the cover glass 71 of the polygon mirror cover 70 from coming into a stray light, according to the third embodiment, corresponding to that shown in FIG. 3 according to the first embodiment.

In this FIG. 5, according to the third embodiment, the parameters mentioned in the first embodiment are so selected and/or determined, that the incident light passes through an outer side of one of edge portions of the fθ lens 21a (however, it may pass through an effective area of the fθ lens 21a), while the light reflecting from the cover glass 71 propagates into a direction of the other flange portion or edge portion of the fθ lens 21a. However, according to the third embodiment, the reflection light is shielded by means of a light-shielding wall 72, which is provided in a front of the other flange portion or edge portion of the fθ lens 21a, and an angle of which is so determined that the reflection light does not turn into the direction of the fθ lens 21a and other optical element parts.

Thus, according to the third embodiment, the light reflecting from the cover glass 71 and the horizontal scanning light are separated from each other before reaching the fθ lens 21a.

As mentioned above, the third embodiment is effective, in particular, in a case where it is desirable to shift the fθ lens 21a forward, but not so much, or when it is desirable to enlarge the fθ lens 21a, but not so much, under the condition near that of the second embodiment.

Although the first to third embodiments show the structures, in each of which the post-deflection optical system 9 has the set of two (2) pieces of fθ lenses 21a and 21b, and the measures against the reflection light from the cover glass 71 of the polygon mirror cover 70 is provided in the vicinity of the fθ lens 21a near the polygon mirror 7a, such the structure for counter measures, as shown in the first to third embodiments, can be also applied into a case where the post-deflection optical system 9 is made up with only one (1) piece of a fθ lens 21.

(D) Fourth Embodiment

Next, explanation will be made on a fourth embodiment of the optical beam scanning device and the image forming apparatus, according to the present invention.

Fourth through sixth embodiments relate to the cases where the post-deflection optical system 9 has a set of three (3) pieces of fθ lenses 21a to 21c, and they are combined with the measures against the reflection light according to the first through third embodiments mentioned above (however, the structures of the first embodiment is always included in that combination).

Figure 6:
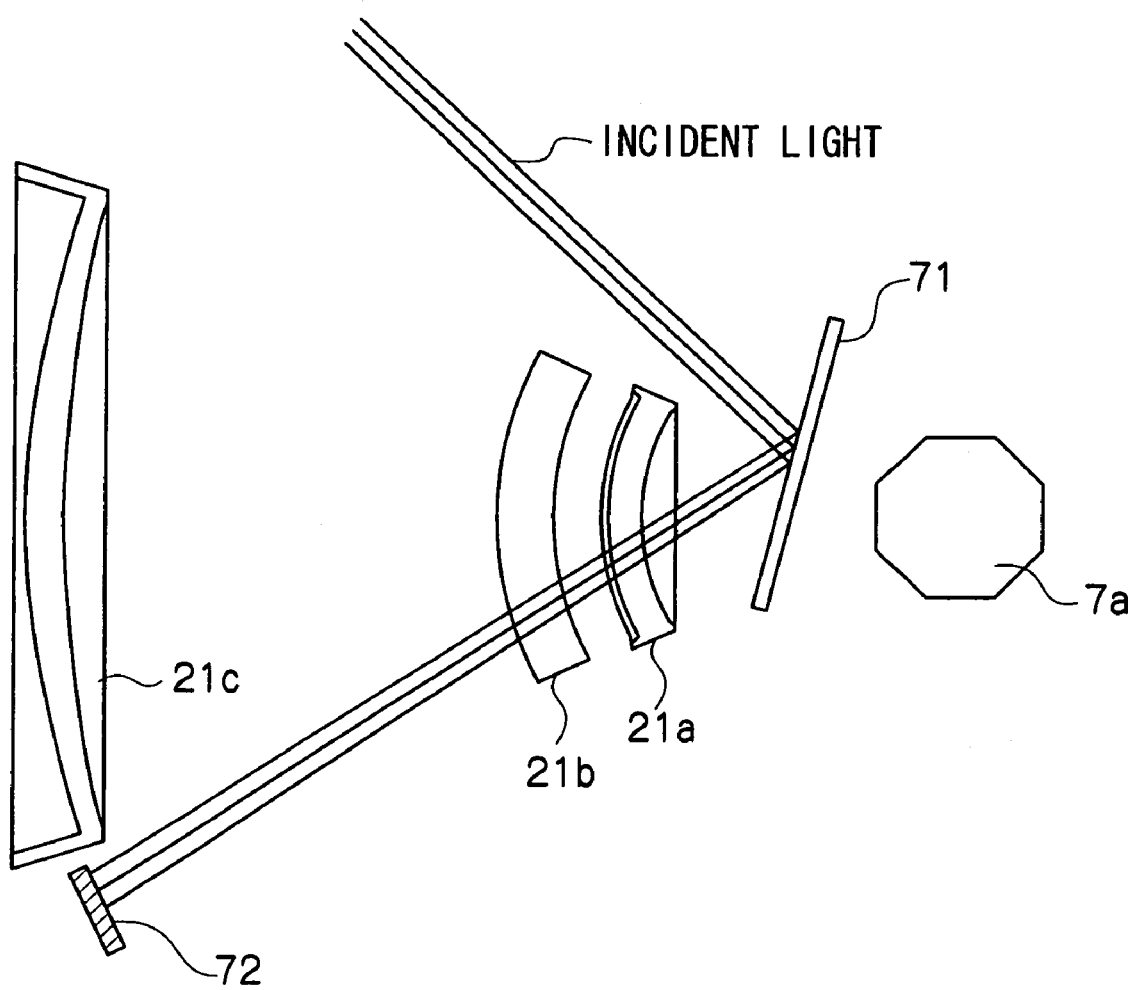
FIG. 6 is a view explaining the structures for counter measures, according to a fourth embodiment, so as to prevent the light reflecting from a cover glass of a polygon mirror cover from coming to be a stray light.

FIG. 6 is a view explaining about the structures of preventing the light reflecting from the cover glass 71 of the polygon mirror cover 70 from coming into a stray light, according to the fourth embodiment of the present invention, and is an enlarged view showing portions up to the fθ lens 21c being most far from the polygon mirror 7a.

In this FIG. 6, according to the fourth embodiment, the incident light passes through outer sides of all the fθ lenses 21a to 21c (however, it may pass through an effective area, such as, of the fθ lens 21a, etc.), while the reflection light from the cover glass 71, after passing through the effective areas of the fθ lenses 21a and 21b, propagates into a direction of an outside of the flange portion or the edge portion of the fθ lens 21c at the most far position thereof, and it is shielded by means of a light-shielding wall 72, which is provided in the vicinity of the flange portion or the edge portion of the fθ lens 21c.

As mentioned above, according to the fourth embodiment, since the reflection light from the cover glass of the polygon mirror cover passes through the effective areas on the fθ lenses 21a and 21b, and also through outer side of the flange portion or the edge portion of the fθ lens 21c, it is possible to avoid the reflection thereof into the direction not intended, upon the flange portions and/or the edge portions of the fθ lenses 21a to 21c, and as a result thereof, it is possible to protect from the deterioration in the picture quality due to the light reflecting from the cover glass.

However, the similar technical concept can be applied therein, even if substituting one (1) piece of fθ lens for a portion of the fθ lenses 21a and 21b, in FIG. 6 mentioned above.

(E) Fifth Embodiment

Next, explanation will be made on a fifth embodiment of the optical beam scanning device and the image forming apparatus, according to the present invention.

Figure 7:
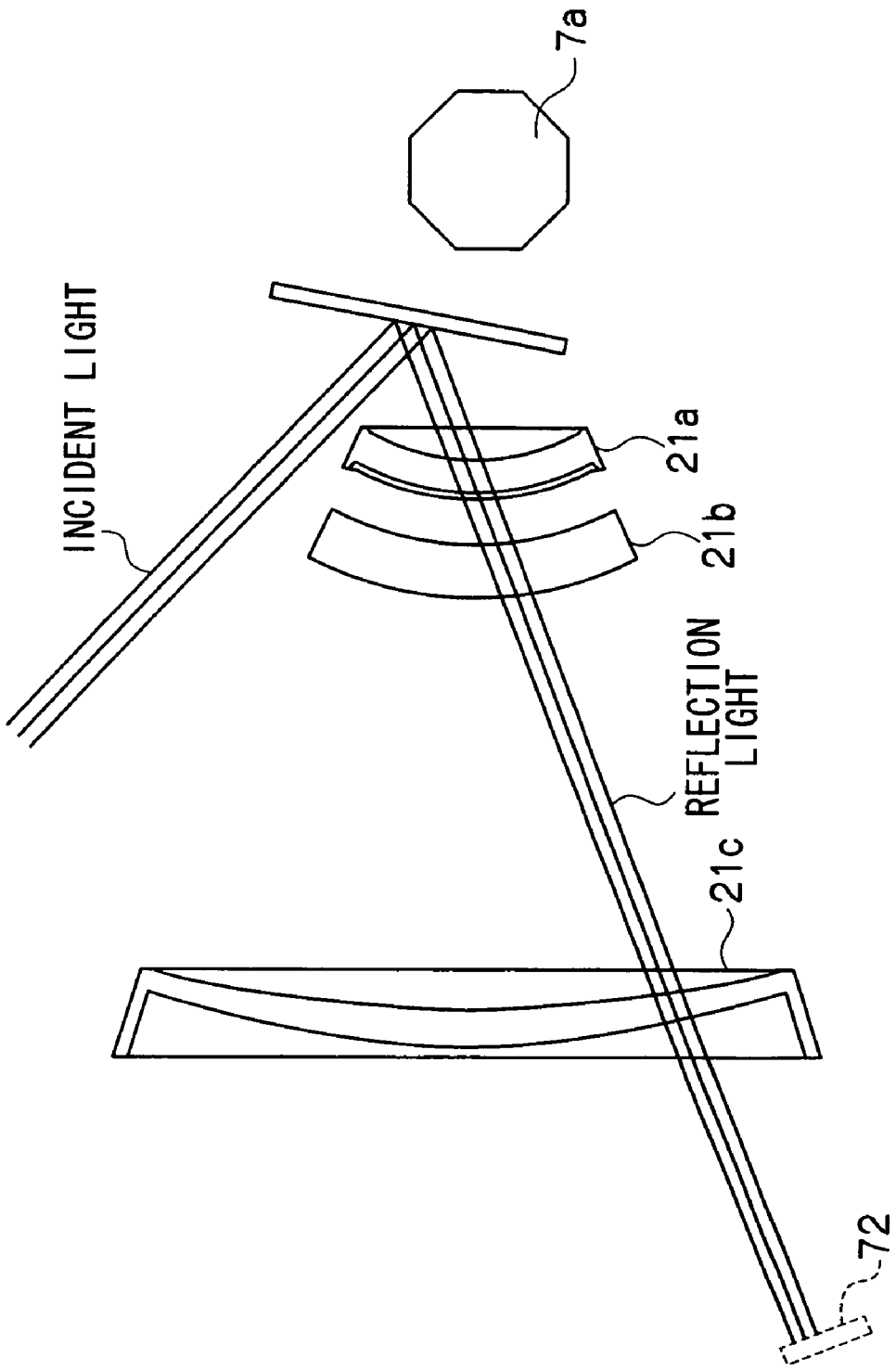
FIG. 7 is a view explaining the structures for counter measures, according to a fifth embodiment, so as to prevent the light reflecting from a cover glass of a polygon mirror cover from coming to be a stray light.

FIG. 7 is a view explaining about the structures of preventing the light reflecting from the cover glass 71 of the polygon mirror cover 70 from coming into a stray light, according to the fifth embodiment of the present invention, and is an enlarged view showing portions up to the fθ lens 21c being most far from the polygon mirror 7a.

In FIG. 7, according to the fifth embodiment, the incident light passes through outer sides of all the fθ lenses 21a to 21c (however, it may pass through an effective area of the fθ lens 21a and the like), while the reflection light from the cover glass 71 propagates, passing through the respective effective areas of all the fθ lenses 21a to 21c. The reflection light, passing through an outside of the flange portion or the edge portion on the fθ lens 21c at the most far position thereof, may be made shielded by means of a light-shielding wall 72, or the shielding of that light may be left to a flame surface, etc., which is provided in the propagation direction of the light without providing the light-shielding wall 72, aggressively.

According to the fifth embodiment, since the reflection light from the cover glass of the polygon mirror cover passes through the effective areas of all the fθ lenses 21a to 21c, it is possible to avoid the reflection thereof into the direction not intended, upon the flange portions and/or the edge portions of the fθ lenses 21a to 21c, and as a result thereof, it is possible to protect from the deterioration in the picture quality due to the light reflecting from the cover glass.

However, the similar technical concept can be applied therein, even if substituting one (1) piece of fθ lens for a portion of the fθ lenses 21a and 21b, in FIG. 7 mentioned above.

(F) Sixth Embodiment

Next, explanation will be made on a sixth embodiment of the optical beam scanning device and the image forming apparatus, according to the present invention.

Figure 8:
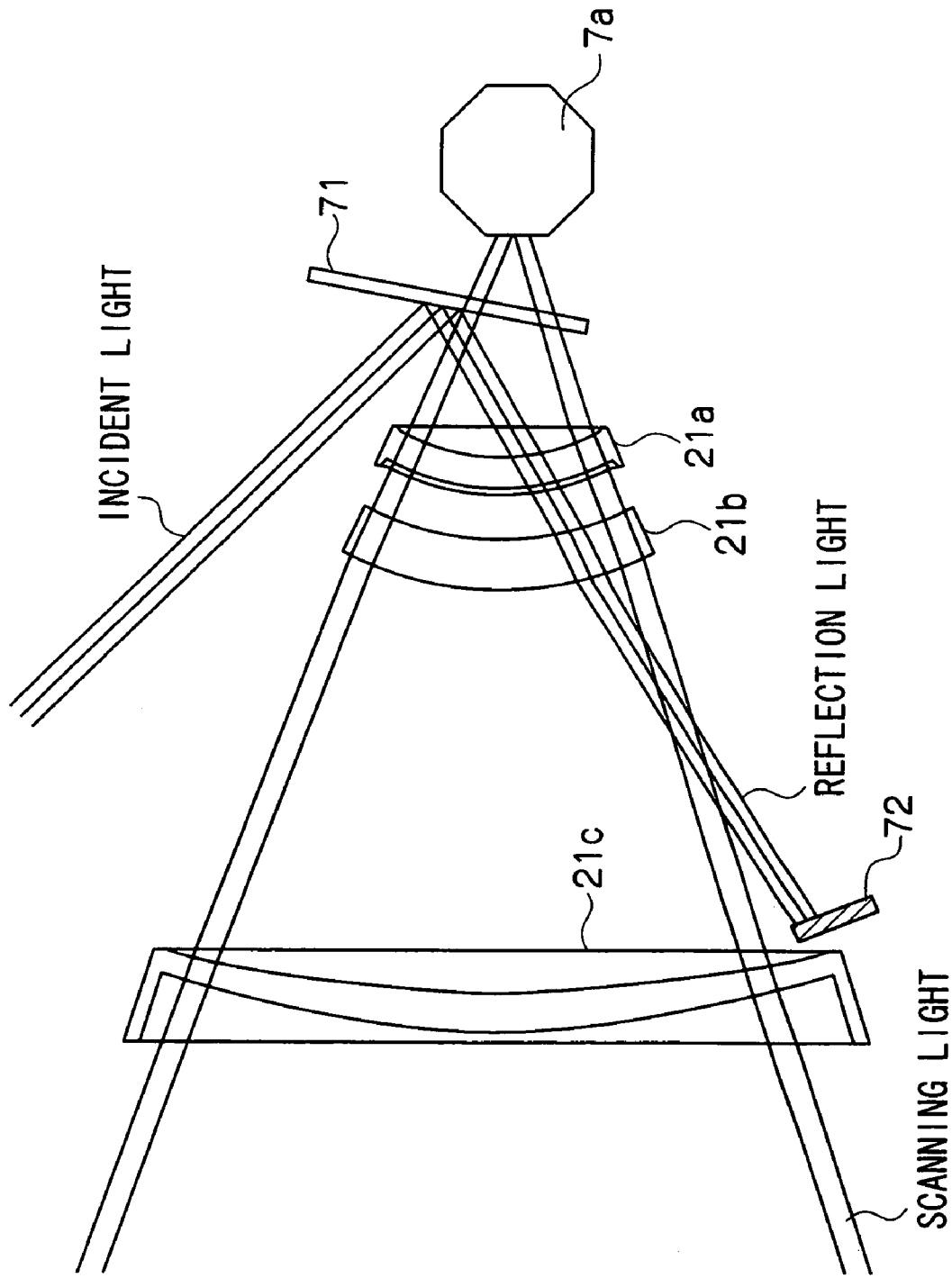
FIG. 8 is a view explaining the structures for counter measures, according to a sixth embodiment, so as to prevent the light reflecting from a cover glass of a polygon mirror cover from coming to be a stray light.

FIG. 8 is an enlarged view explaining about the structures of preventing the light reflecting from the cover glass 71 of the polygon mirror cover 70 from coming into a stray light, according to the sixth embodiment of the present invention, and is a view showing portions up to the fθ lens 21c being most far from the polygon mirror 7a.

In this FIG. 8, according to the sixth embodiment, the incident light passes through outer sides of all the fθ lenses 21a to 21c (however, it may pass through an effective area of the fθ lens 21a and the like.), while the reflection light from the cover glass 71, after passing through the effective areas of the fθ lenses 21a and 21b, propagates into a direction of the flange portion or the edge portion of the fθ lens 21c at the most far position thereof, or an outside direction thereof, and it is shielded by means of a light-shielding wall 72, which is provided in front of the flange portion or the edge portion of the fθ lens 21c.

According to the sixth embodiment, since the reflection light from the cover glass of the polygon mirror cover passes through the effective areas on the fθ lenses 21a and 21b, and it is shielded in front of the flange portion or the edge portion of the fθ lens 21c, it is possible to avoid the reflection thereof into the direction not intended, upon the flange portions and/or the edge portions of the fθ lenses 21a to 21c, and as a result thereof, it is possible to protect from the deterioration in the picture quality due to the light reflecting from the cover glass.

However, the similar technical concept can be applied therein, even if substituting one (1) piece of fθ lens for a portion of the fθ lenses 21a and 21b, in FIG. 8 mentioned above.

(G) Other Embodiments

Although various embodiments are mentioned in the explanation about the respective embodiments given above, it is further possible to list up the following variations and other embodiments, which will be disclosed hereinafter.

In each of the embodiments mentioned above, there is shown the case where the present invention is applied into the four (4) optical beams scanning device. However, the number of optical beams should not be limited to that mentioned above, but it may be more or less than that. Also, the present invention may be applied into a monochromatic device, as well as, the color device, without distinguishing therebetween.

Also, the number of pieces of the fθ lenses should not be limited to that shown in the embodiments mentioned above.

In case where the number of piece of the fθ lens is one (1), the technical concept, which was explained in the first to third embodiments, may be applied therein.

In case where the number of pieces of the fθ lenses is two (2), the first to third embodiments may be applied therein, when treating the light shielding process upon the fθ lens near the cover glass, while the method explained as the variations in the fourth to sixth embodiments may be applied therein, when treating the light shielding process upon the fθ lens far from the cover glass.

In case where the number of pieces of the fθ lenses is three (3), the first to third embodiments may be applied therein, when treating the light shielding process upon the fθ lens near the cover glass, while the method explained as the variations in the fourth to sixth embodiments may be applied therein, when treating the light shielding process upon the second fθ lens near the cover glass, and also the fourth to sixth embodiments may be applied therein, when treating the light shielding process upon the second fθ lens at the side most far from the cover glass.

Even in cases where the number of pieces of the fθ lenses is four (4) or more, it is also similar to that mentioned above. Thus, a method similar to that of the case where the number of pieces of the fθ lenses is three (3) may be applied therein, so as to when treating the light shielding process upon the third fθ lens near the cover glass, and when treating the light shielding process upon the fθ lens far from the cover glass, there may be applied the method, which explained in the first to third embodiments, in relation to the fθ lens far from the cover glass, while passing the light through the effective areas of the lenses up to that.

Although in the embodiments mentioned above, there is shown the one, in which the optical element parts in the post-reflection optical system are the fθ lenses, relating to the measures against the reflection light, the present invention may be also applied onto optical element parts having other functions, so that no fixed stray light is generated, due to an outer portion of the effective area of the flange portion and/or the edge portion. For example, the mirror positioned in a downstream of the group of the fθ lenses or between the fθ lenses may be treated as an optical element part of the post-reflection optical system, in relation to the measures against the reflection light.

Although in the embodiments mentioned above, there is shown the one, in which the one (1) of the polygon mirror is applied for use of the one (1) set of the optical beam scanning device, the present invention may be applied into, also in the cases where the one (1) of the polygon mirror is applied into, for example, in common use of two (2) sets or more of the optical beam scanning devices.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical beam scanning device, comprising:
   a light deflecting device, at least a polygon mirror portion of which is covered by a cover having a cover window portion for keeping a passage for an entering/emitting light;
   a pre-deflection optical system for entering an optical beam from a light source into said light deflecting device; and
   a post-deflection optical system for focusing a reflection light from said light deflecting device on a surface to be scanned,
   wherein constituent elements of said light deflecting device and said post-deflection optical system and said cover window portion are so disposed that the pretreated light-shielding reflection light from said cover window portion, avoids from striking upon a flange portion and an edge portion of one or a plurality of said optical element parts within said post-deflection optical system, with respect to said entering light,
   the optical systems do not match, with the optical axis of the post-deflection optical system, the direction when the optical axis of entering light is projected on a plane including a central optical axis of the post-deflection optical system and a main scanning direction axis, and
   the optical systems are configured to partially overlap an incident light and a reflection light in an effective area of a cover glass; wherein the constituent elements of said light deflecting device and said post-deflection optical system and said cover window portion are disposed, so that the pretreated light-shielding reflection light from said cover window portion passes through an outside of a certain optical element part; and wherein a light shielding structure is provided in vicinity of the certain optical element part, through which said reflection light passes in the outside thereof.

2. The optical beam scanning device according to claim 1, wherein the constituent elements of said light deflecting device and said post-deflection optical system and said cover window portion are so disposed that the pretreated light-shielding reflection light from said cover window portion passes through the effective area in the optical element part, for all of the one or plurality of said optical element parts existing, when the one or plurality of said optical element parts exist before said reflection light reaches the certain optical element part, an outside of which is passed by the reflection light.

3. The optical beam scanning device according to claim 1, wherein the light shielding structure is provided in front of the optical element part, a flange portion and an edge portion of which the pretreated light-shielding reflection light directs from said cover window portion.

4. The optical beam scanning device according to claim 3, wherein the constituent elements of said light deflecting device and said post-deflection optical system and said cover window portion are so disposed that the pretreated light-shielding reflection light from said cover window portion passes through the effective area in the optical element part, for all of the one or plurality of said optical element parts existing, when the one or plurality of said optical element parts exist before said reflection light reaches the optical element part, a flange portion and an edge portion of which the reflection light directs.

5. The optical beam scanning device according to claim 1, wherein the constituent elements of said light deflecting device and said post-deflection optical system and said cover window portion are so disposed that the pretreated light-shielding reflection light from said cover window portion passes through the effective area in the one or plurality of said optical element parts from a side of said cover window portion, whereby being separated from a passage of a scanning light.

6. The optical beam scanning device according to claim 5, wherein a light shielding structure is provided at position where the pretreated light-shielding reflection light from said cover window portion is separated from the passage of the scanning light.

7. An image forming apparatus, comprising:
   an optical beam scanning device including:
      a light deflecting device, at least a polygon mirror portion of which is covered by a cover having a cover window portion for keeping a passage for an entering/emitting light;
      a pre-deflection optical system for entering an optical beam from a light source into said light deflecting device; and
      a post-deflection optical system for focusing a reflection light from said light deflecting device on a surface to be scanned,
      wherein constituent elements of said light deflecting device and said post-deflection optical system and said cover window portion are disposed, so that the pretreated light-shielding reflection light from said cover window portion, avoids from striking upon a flange portion and an edge portion of one or plurality of said optical element parts within said post-deflection optical system, with respect to said entering light; and
   a photosensitive body having a surface to be scanned, on which a latent image is formed upon basis of an optical beam from said optical beams scanning device,
   the optical systems do not match, with the optical axis of the post-deflection optical system, the direction when the optical axis of entering light is projected on a plane including a central optical axis of the post-deflection optical system and a main scanning direction axis, and
   the optical systems are configured to partially overlap an incident light and a reflection light in an effective area of a cover glass; wherein the constituent elements of said light deflecting device and said post-deflection optical system and said cover window portion are disposed, so that the pretreated light-shielding reflection light from said cover window portion passes through an outside of a certain optical element part; and wherein a light shielding structure is provided in vicinity of the certain optical element part, through which said reflection light passes in the outside thereof.

* * * * *